United States Patent
Henderson et al.

(10) Patent No.: US 10,975,851 B2
(45) Date of Patent: Apr. 13, 2021

(54) TORQUE BOX ACTUATOR WITH SHAPE MEMORY ALLOY

(71) Applicant: Johnson Controls Technology Company, Auburn Hills, MI (US)

(72) Inventors: Kirk P. Henderson, Oconomowoc, WI (US); John T. Pierson, Whitefish Bay, WI (US); Julie Ahl, Milwaukee, WI (US); Kevin A. Weiss, Gurnee, IL (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/372,145

(22) Filed: Apr. 1, 2019

(65) Prior Publication Data
US 2020/0309102 A1    Oct. 1, 2020

(51) Int. Cl.
*F03G 7/06* (2006.01)
*F24F 13/14* (2006.01)

(52) U.S. Cl.
CPC .......... *F03G 7/065* (2013.01); *F24F 13/1426* (2013.01); *F16F 2224/0258* (2013.01)

(58) Field of Classification Search
CPC ............ F03G 7/065; G01K 5/483; G12B 1/00
See application file for complete search history.

(56) References Cited

U.S. PATENT DOCUMENTS

| | | | | |
|---|---|---|---|---|
| 8,051,656 B1* | 11/2011 | Cripe | ...................... | F03G 7/065 60/528 |
| 2004/0145563 A9* | 7/2004 | Rosenberg | .............. | A63F 13/06 345/156 |
| 2007/0216194 A1* | 9/2007 | Rober | ..................... | B62D 37/02 296/180.1 |
| 2008/0238246 A1* | 10/2008 | Smith | ..................... | F03G 7/065 310/314 |
| 2009/0143730 A1* | 6/2009 | De Polo | .............. | A61M 5/1452 604/131 |
| 2019/0048860 A1* | 2/2019 | Karnofski | ............... | F01D 15/12 |

FOREIGN PATENT DOCUMENTS

WO    WO-2018173742 A1 *  9/2018  ............. H02N 11/00

OTHER PUBLICATIONS

English Translation WO 2018173742 A1 (Year: 2018).*

* cited by examiner

*Primary Examiner* — Shafiq Mian
(74) *Attorney, Agent, or Firm* — Foley & Lardner LLP

(57) ABSTRACT

An actuator system includes a shaft hub having a shaft and one or more rotation arms coupled to the shaft, one or more shape memory alloy springs coupled to the one or more rotation arms, and as a voltage source configured to apply a voltage to the one or more shape memory alloy springs. The voltage causes the one or more shape memory alloy springs to change in size or shape, thereby applying a force to the one or more rotation arms and causing the shaft hub to rotate. The actuator system also includes a processing circuit configured to receive an indication of a desired incremental rotation for the shaft hub and apply a voltage corresponding to the desired incremental rotation to the one or more shape memory alloy springs, causing the shaft and the shaft hub to rotate about a central axis.

20 Claims, 8 Drawing Sheets

TORQUE BOX ACTUATOR WITH SHAPE MEMORY ALLOY

BACKGROUND

The present disclosure relates generally to actuators which may operate in conjunction with other components or systems. The present disclosure relates more particularly to actuation by applying voltages to shape memory alloy components.

Actuation systems often include multiple geared members as well as one or more motors. Both geared members and motors can take up large amounts of space and can also be subject to wear, leading to short lifespans of the components. Actuators that are both space-efficient and offer better longevity than traditional geared mechanisms are desirable.

Traditional geared mechanisms comprising geared members and one or more motors are often expensive. Additionally, short lifespans of components exacerbate costs associated with traditional geared mechanisms as frequent repair and replacement can be required. As such, actuators that are more cost-efficient and offer longer lifespans for both systems and component parts are desirable.

SUMMARY

One implementation of the present disclosure is an actuator system including a shaft hub, further including a shaft and one or more rotation arms coupled to the shaft, as well as one or more shape memory alloy springs coupled to the one or more rotation arms, and a voltage source. The voltage source can be configured to apply a voltage to the one or more shape memory alloy springs, the voltage causing the one or more shape memory alloy springs to change in size or shape, thereby applying a force to the one or more rotation arms and causing the shaft hub to rotate. A processing circuit including a processor and memory storing instructions executed by the processor may also be included, the processing circuit configured to receive an indication of a desired incremental rotation for the shaft hub and apply a voltage corresponding to the desired incremental rotation for the shaft hub to the one or more shape memory alloy springs rotating the shaft and the shaft hub about a central axis.

In some embodiments, the actuator system can include the voltage source connected to the shape memory alloy springs and capable of providing alternating low-voltage pulses of varying magnitudes and durations.

In some embodiments, the actuator system can include the rotation arms including at least two collinear shaft arms, wherein each of the shape memory alloy springs are connected to one of the collinear shaft arms on a distal portion thereof.

In some embodiments, the actuator system can include the shape memory alloy springs coupled to the collinear shaft arms and extending from the shaft hub arms at an oblique angle and further coupled to the voltage source, with the shape memory alloy springs forming a V-shape.

In some embodiments, the actuator system can include shape memory alloy springs coupled to the collinear shaft hub arms and the voltage source such that the shape memory alloy springs are configured parallel to one another.

In some embodiments, the actuator system can include the voltage determined in response to the desired incremental rotation for the shaft hub.

In some embodiments, the actuator system can include the voltage source applying the voltage to the one or more shape memory alloy springs such that complimentary contraction and elongation of the one or more shape memory alloy springs occur rotating the shaft and the shaft hub about a central axis.

In some embodiments, the actuator system can include the shaft hub configured to rotate according to a designated incremental rotation.

In some embodiments, the actuator system can include the shaft hub configured to lock after successively rotating the designated incremental rotation.

In some embodiments, the actuator system can include the shape memory alloy springs having a nickel titanium alloy.

Another implementation of the present disclosure is a control system including a processing circuit, a processor, and memory storing instructions executed by the processor. The processing circuit is configured to receive an indication of a desired incremental rotation for a shaft and a shaft hub, the shaft hub coupled to rotation arms, determine a voltage corresponding to the desired incremental rotation of the shaft hub, and apply the voltage from a voltage source to one or more shape memory alloy springs through wires, the voltage causing the one or more shape memory alloy springs to change in size or shape, thereby applying a force to one or more rotation arms and causing the shaft hub to rotate.

In some embodiments, the control system can include the voltage source connected to the one or more shape memory alloy springs and configured to provide the voltage as alternating voltage pulses of varying magnitudes and durations.

In some embodiments, the control system can include the rotation arms including at least two collinear shaft arms, with each of the one or more shape memory alloy springs connected to one of the collinear shaft arms on a distal portion thereof.

In some embodiments, the control system can include the one or more shape memory alloy springs coupled to the collinear shaft arms and extending from the collinear shaft arms at an oblique angle, and are further coupled to the voltage source, with the one or more shape memory alloy springs forming a V-shape.

In some embodiments, the control system can include the one or more shape memory alloy springs coupled to the collinear shaft arms and the voltage source such that the one or more shape memory alloy springs are parallel to one another.

In some embodiments, the control system can include the shape memory alloy springs having a nickel titanium alloy.

In some embodiments, the control system can include the voltage source applying the voltage to the one or more shape memory alloy springs such that at least one of the shape memory alloy springs is contracted while another of the shape memory alloy springs is elongated, rotating the shaft and the shaft hub about a central axis.

In some embodiments, the control system can include the shaft hub configured to rotate according to a designated incremental rotation.

In some embodiments, the control system can include the shaft hub configured to lock after successively rotating the designated incremental rotation.

Another implementation of the present disclosure include a method of actuation. The method includes receiving an indication of a desired incremental rotation for a shaft hub, the shaft hub coupled to rotation arms, and determining a voltage corresponding to the desired incremental rotation of the shaft hub. The method includes applying the voltage from a voltage source to one or more shape memory alloy springs through wires, the voltage causing the one or more shape memory alloy springs to change in size or shape, thereby applying a force to one or more rotation arms, and rotating the shaft hub as a result of the force applied by the one or more shape memory alloy springs to the one or more rotation arms.

DETAILED DESCRIPTION

Overview

The present disclosure includes the use of shape memory alloy components for actuation. Actuators are commonly used equipment, with most actuators being geared mechanisms comprising geared members and one or more motors. As such, the component parts of traditional geared mechanism actuators can have poor longevity and are often costly. Such costly components can be difficult to replace given the combination of high cost and short lifespan.

Shape memory alloys are materials that have certain behavior under some conditions and also have the ability to retain a shape or return to a shape. For example, in nickel titanium alloys, specifically configured as springs, low-voltage pulses can cause the alloys to contract. As such, applying low-voltage pulses to shape memory alloy springs can cause contraction and subsequent elongation of the springs when indirectly coupled. Further, by connecting shape memory alloy springs to a shaft hub and applying alternating pulses to the springs, alternate contraction and elongation can occur thus actuating the shaft hub.

Figure 1:
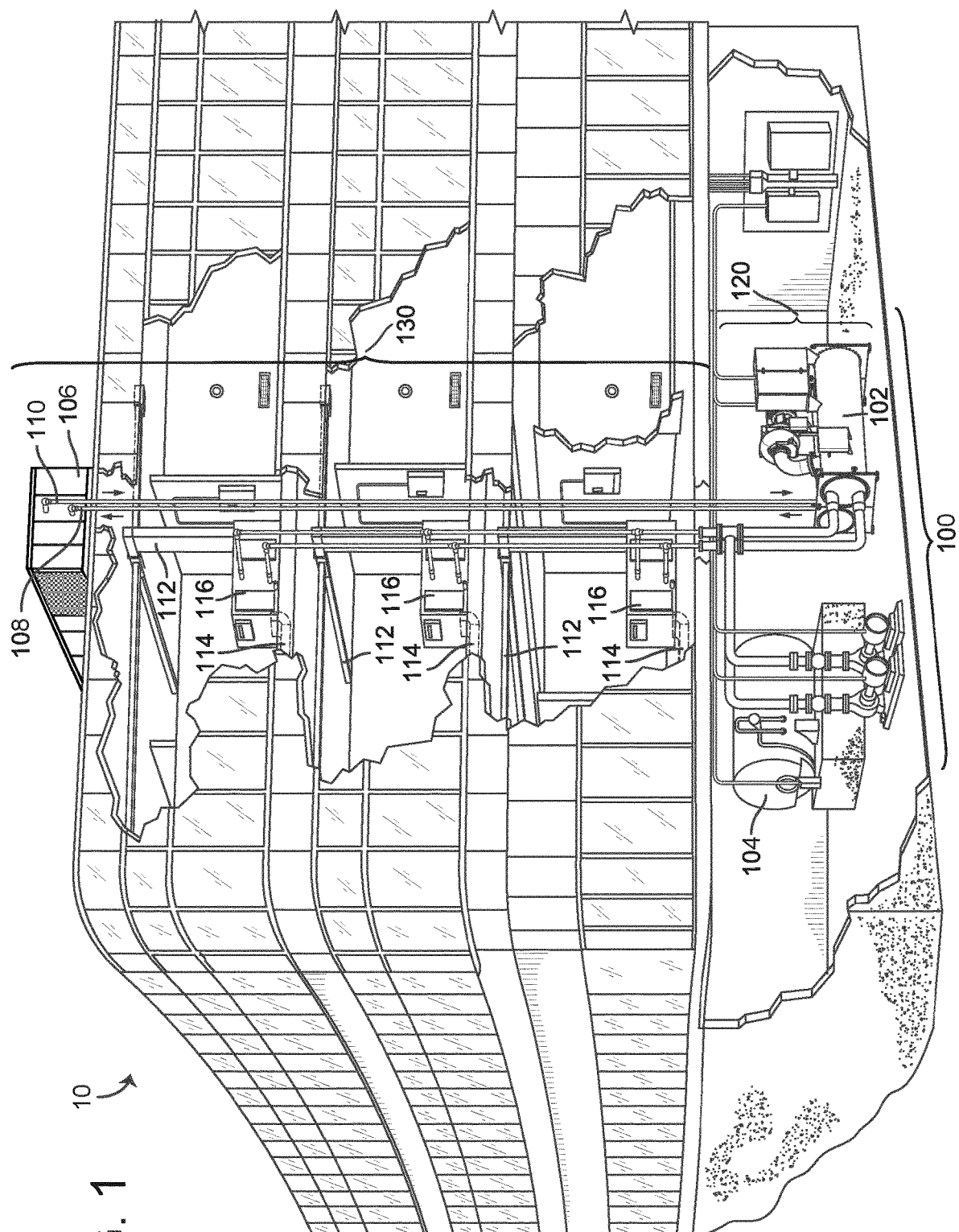
FIG. 1 is a drawing of a building equipped with a HVAC system, according to some embodiments.
Figure 2:
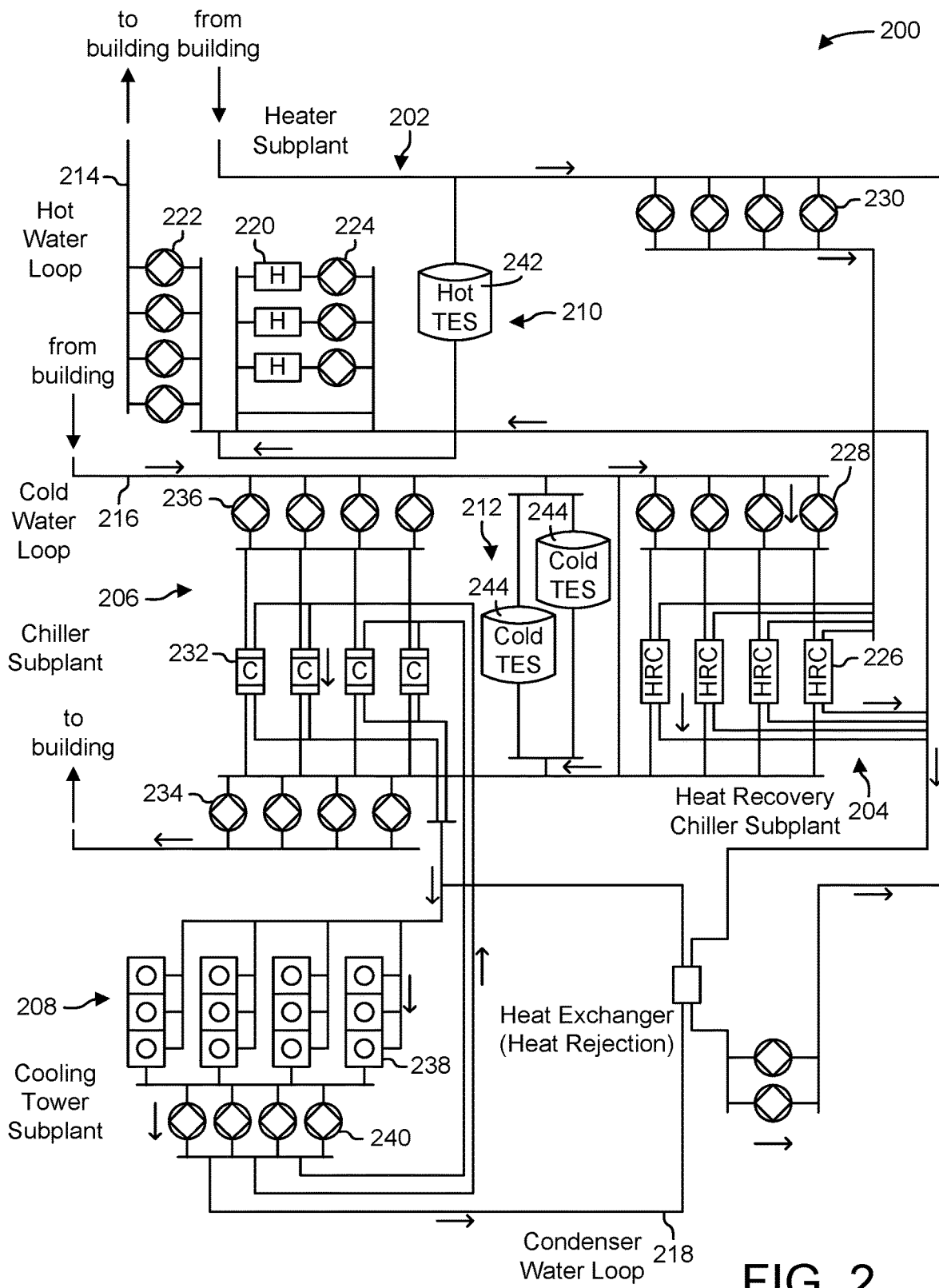
FIG. 2 is a schematic diagram of a waterside system which can be used in conjunction with the building of FIG. 1, according to some embodiments.
Figure 3:
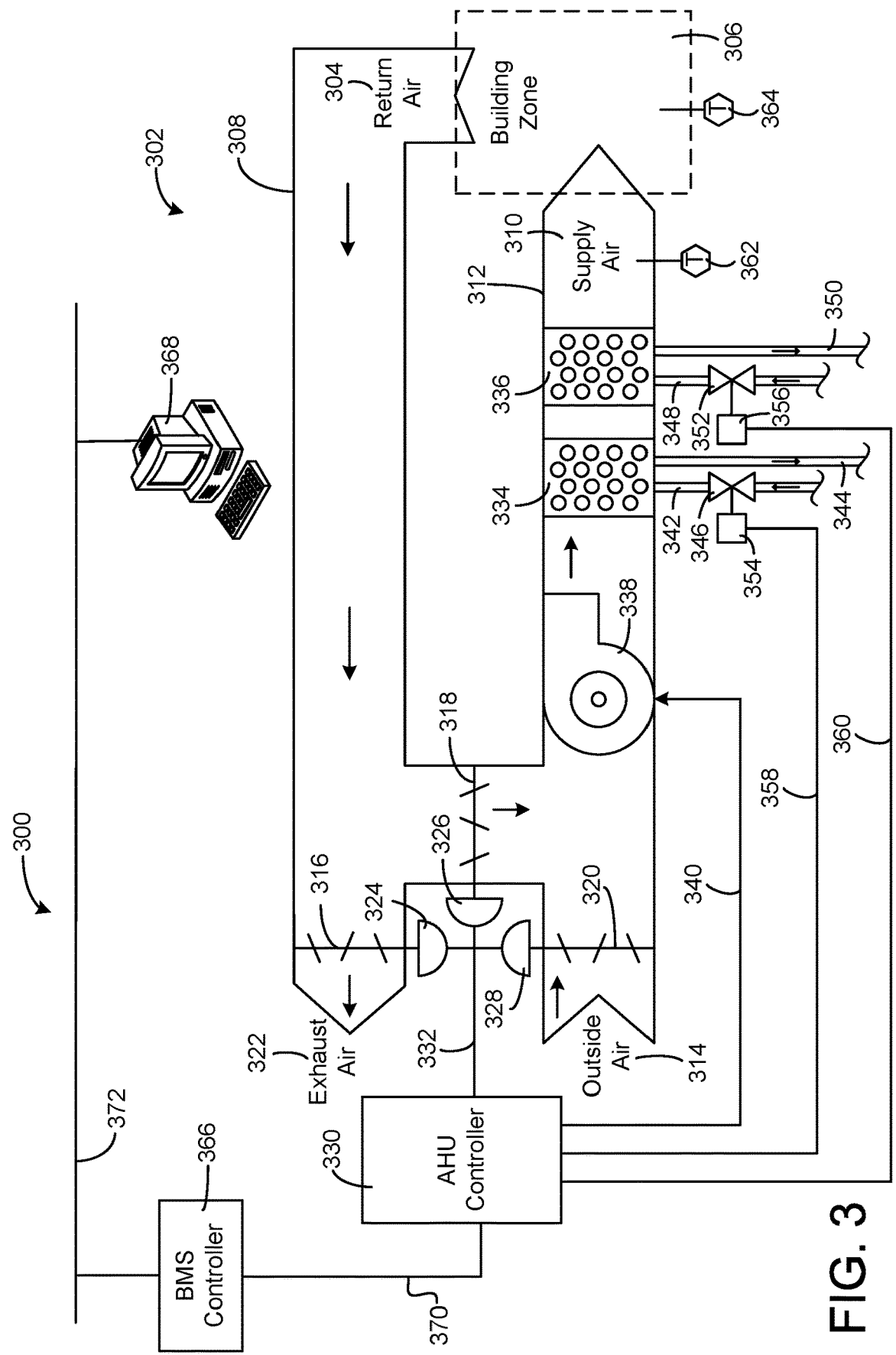
FIG. 3 is a schematic diagram of an airside system which can be used in conjunction with the building of FIG. 1, according to some embodiments.
Figure 4:
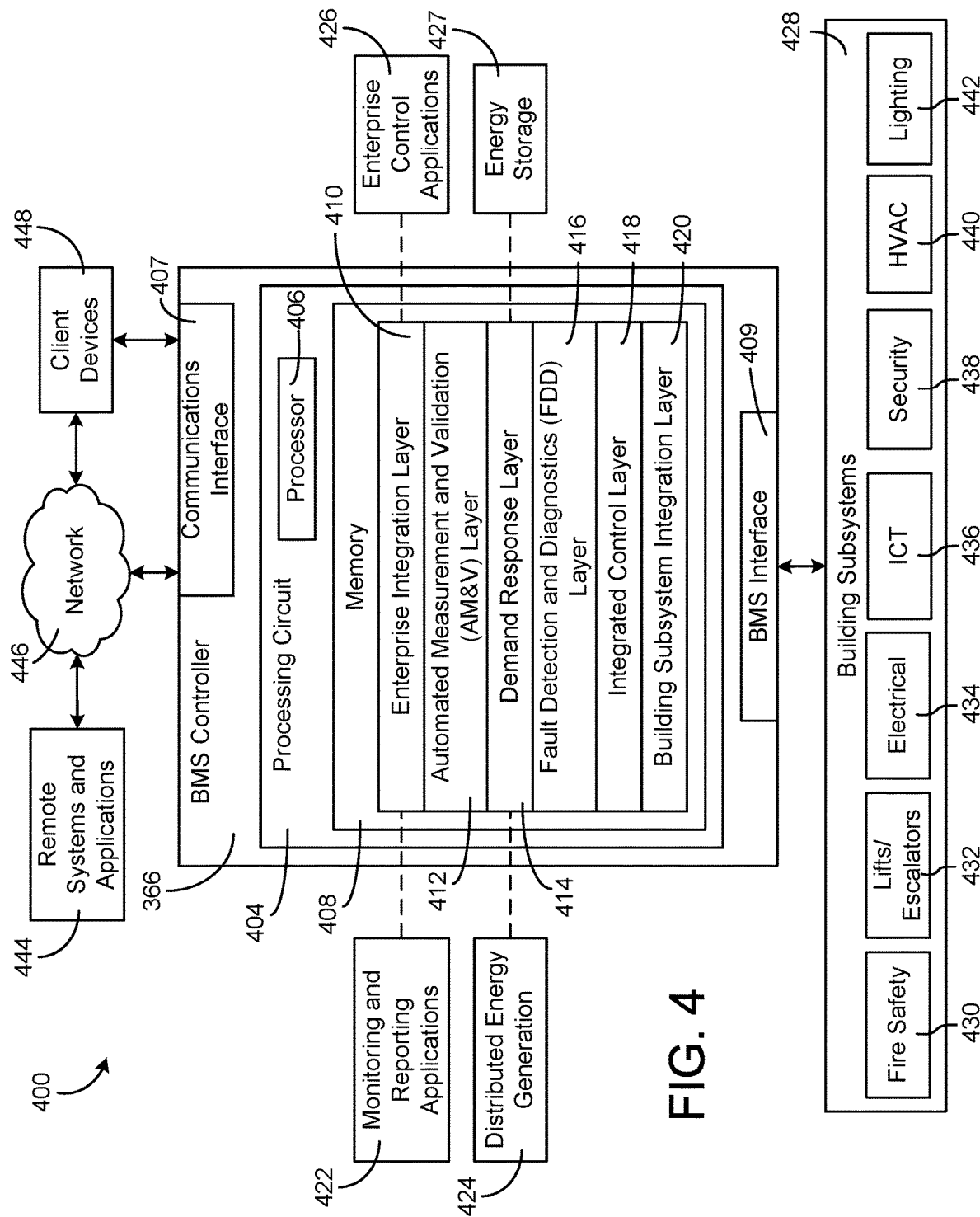
FIG. 4 is a block diagram of a building management system (BMS) which can be used to monitor and control the building of FIG. 1, according to some embodiments.
Figure 5:
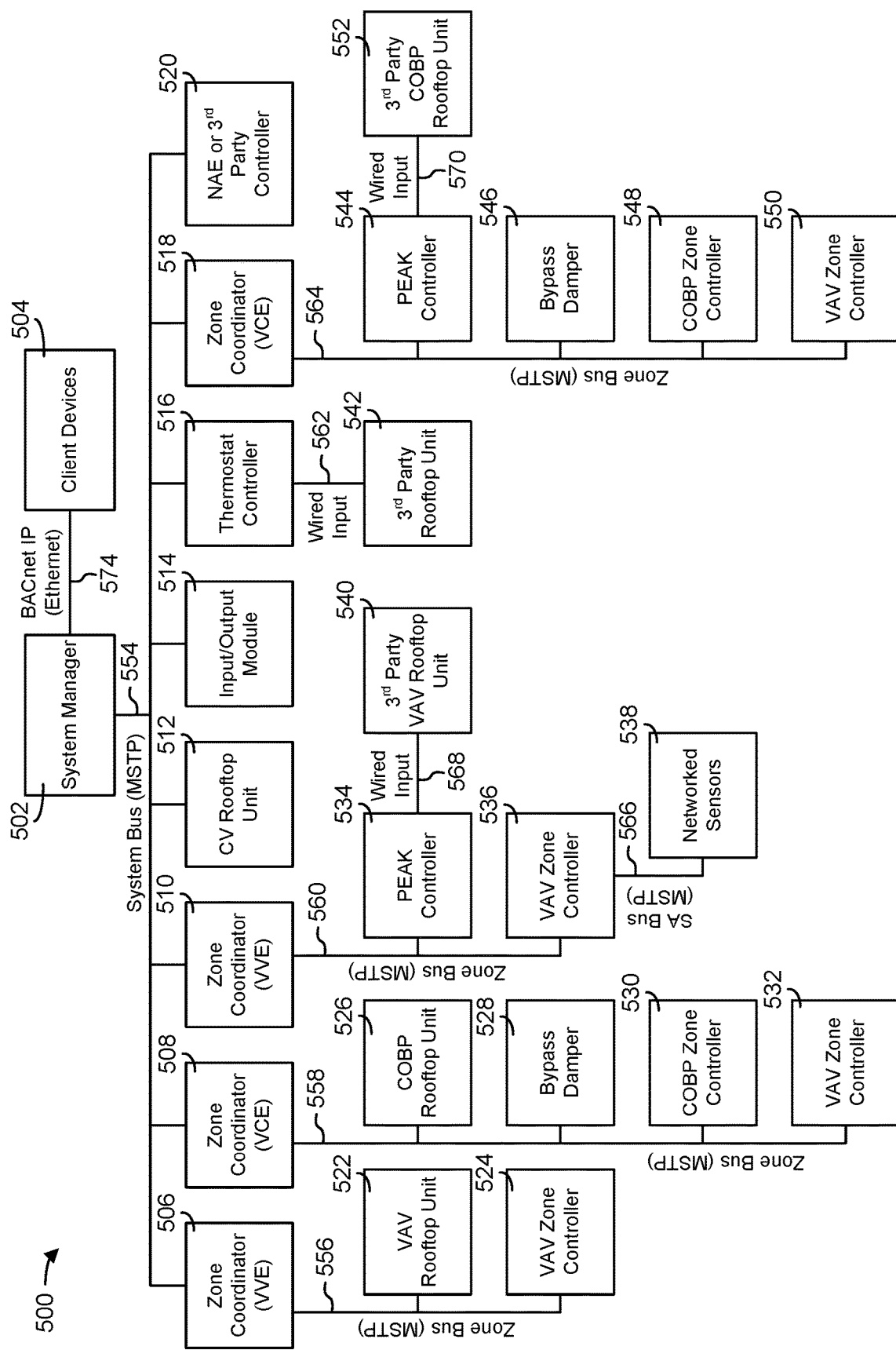
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (TOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Torque Box Actuator with Shape Memory Alloy

Figure 6:
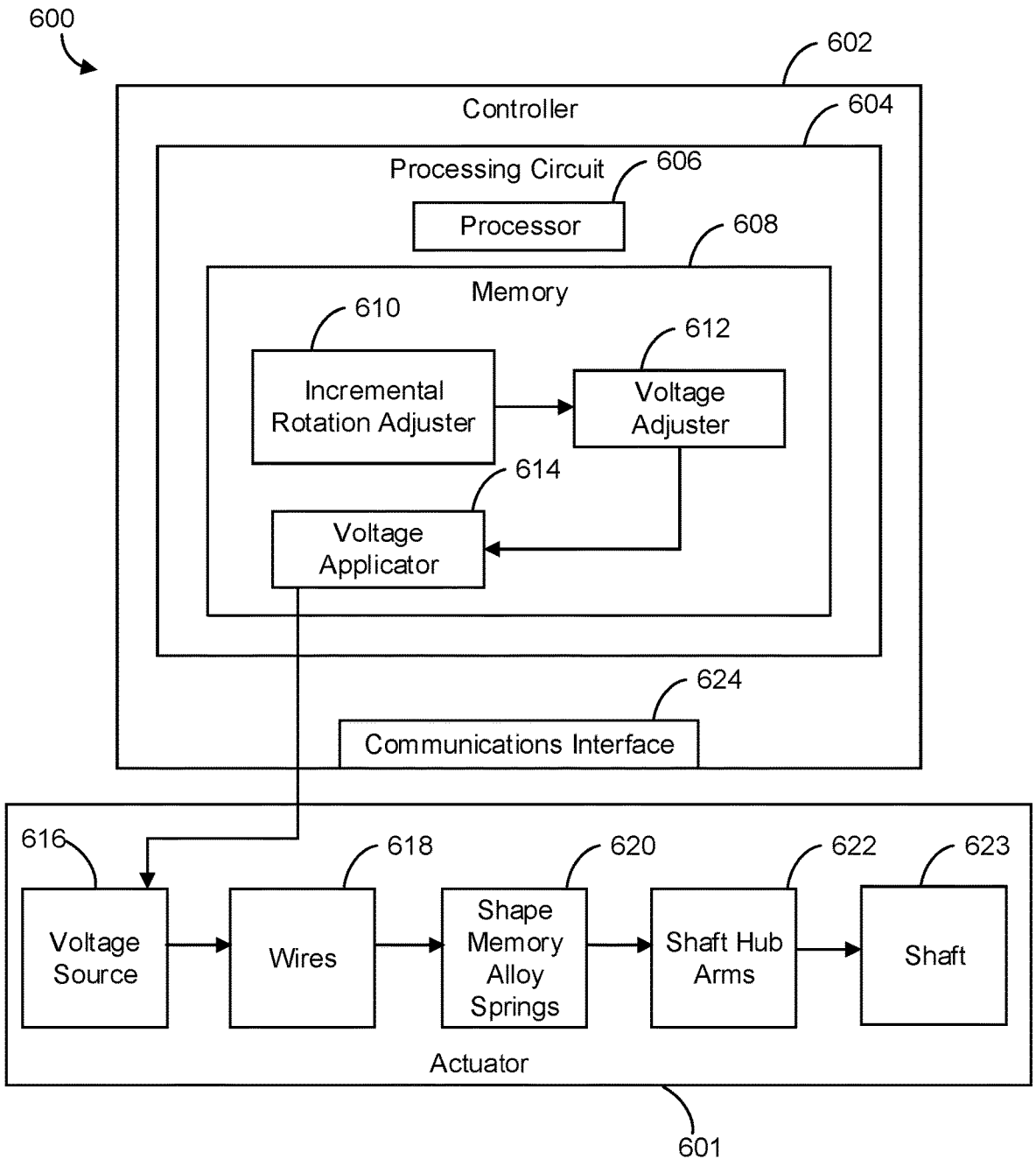
FIG. 6 is a block diagram of a control system including a controller and an actuator with shape memory alloy components, according to some embodiments.

Referring now to FIG. 6, a block diagram of a control system including a controller and an actuator with shape memory alloy components is shown, according to some embodiments. In some embodiments, system 600 can be configured to function in conjunction with other systems. System 600 can further vary in size and shape of system 600 as well as components thereof. For example, in some embodiments component dimensions can vary according to size, shape and length, among other properties. It should also be noted that control system 600 can be implemented in combination or in conjunction with one or more other systems. For example, control system 600 may be implemented in conjunction with building 10 and HVAC system 100 of FIG. 1. Further, control system 600 may be implemented in conjunction with waterside system 200 of FIG. 2. Similarly, control system 600 may be implemented in conjunction with one or more of the buildings and/or systems shown in FIGS. 1-5.

System 600 is shown to include an actuator 601 and a controller 602, according to some embodiments. Actuator 601 can be implemented in various different technologies. For example, in some embodiments actuator 601 may function in conjunction with other systems and/or components, such as for example the systems and components of FIGS. 1-5. In other embodiments, actuator 601 may function independent of other components. In still additional embodiments, actuator 601 may be coupled to one or more other components so as to drive motion, for example.

Actuator 601 is shown to include a voltage source 616, wires 618, shape memory alloy springs 620, and shaft hub arms 622 according to the exemplary embodiment of FIG. 6. In some embodiments, voltage source 616 can be in a fixed position or may be portable so as to enable portability of both voltage source 616 as well as actuator 601. Actuator 601 is further shown to be coupled to wires 618. In some embodiments, wires 618 may consist of two or more wires, and the composition, length and configuration of wires 618 can vary. For example, in some embodiments wires 618 may include a pair of wires coupled to voltage source 616, while in other embodiments wires 618 may include several wires coupled to voltage source 616 at one or more coupling points. Actuator 601 also includes shape memory alloy springs 620, according to some embodiments. Shape memory alloy springs 620 can be coupled to voltage source 616 via wires 618, as shown in the exemplary embodiment of FIG. 6. Wires 618 can provide electrical communication between voltage source 616 and shape memory alloy springs 620 which may include transmitting one or more voltages from voltage source 616 to shape memory alloy springs 620. Wires 618 may be coupled to one or more points of shape memory alloy springs 620. Actuator 601 is also shown to include shaft hub arms 622, according to an exemplary embodiment. Shaft hub arms 622 can be coupled to shape memory alloy springs 620 at one or more coupling points. In some embodiments, shape memory alloy springs 620 may be coupled to shaft hub arms 622 such that movement of shape memory alloy springs 620 can drive movement of shaft hub arms 622. Is should be noted that, according to various embodiments, actuator 601 may include voltage source 616, wires 618, shape memory alloy springs 620 and shaft hub arms 622 in varying sizes, quantities, and configurations. Shaft hub arms 622 can be coupled to a shaft 623, as shown in FIG. 6. In some embodiments, shaft 623 may be configured such that it may rotate about a central point so as to enable various teeter-totter motion of the shaft hub arms 622. In some embodiments, shaft 623 may vary in height and diameter, but may be of a generally cylindrical shape. In still other embodiments, shaft 623 may be of a shape other than a cylinder. Shaft 623 may be coupled to shaft hub arms 623 at one or more coupling points, allowing for teeter-totter motion of shaft hub arms 622 to actuate shaft 623. In some embodiments, shaft 623 can be coupled to one or more pieces of additional equipment so as to actuate and/or drive movement thereof.

In some embodiments, actuator 601 applies a voltage from voltage source 616 to shape memory alloy springs 620, which can be transmitted by wires 618. Shape memory alloy springs 620 can be configured such that the supplication of various voltages including those applied by voltage source 616 via wires 618 may drive shape memory alloy springs 620 to deviate from a neutral shape. In some embodiments, shape memory alloy springs 620 will return to a standard shape upon any lapse or discontinuation of applied voltage. For example, the application of voltage pulses by voltage source 616 may drive shape change in shape memory alloy springs 620 and subsequently drive teeter-totter motion in shaft hub arms 622.

Controller 602 is shown to include a processing circuit 604, a processor 606, and a memory 608. Controller 602 can include one or more computer systems (e.g., servers, supervisory controllers, subsystem controllers, etc.) that serve as system level controllers, application or data servers, head nodes, or master controllers for system 600. Controller 602 may communicate with multiple downstream systems or subsystems.

Controller 602 is shown to include a communications interface 624 and a processing circuit 604 having a processor 606 and memory 608. Processor 606 can be implemented as a general-purpose processor, an application specific integrated circuit (ASIC), one or more field programmable gate arrays (FPGAs), a group of processing components, or other suitable electronic processing components.

Memory 608 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 608 can be or include volatile memory or non-volatile memory. Memory 608 can include database components, object code components, script components, or any other type of information structure for supporting the various activities and information structures described in the present application. According to some embodiments, memory 608 is communicably connected to processor 606 via processing circuit 604 and includes computer code for executing (e.g., by processing circuit 604 and/or processor 606) one or more processes described herein.

Memory 608 is shown to include an incremental rotation adjuster 610. Incremental rotation adjuster 610 can allow for rotation of the shaft of system 600 to be adjusted incrementally, for example in 5-degree increments. In some embodiments, incremental rotation adjuster 610 can function based on an input from a user and/or operator, while in some embodiments incremental rotation adjuster 610 may function in other ways. For example, in some embodiments incremental rotation adjuster 610 can include constraints specific to user and/or operator specifications or may include constraints specific to some embodiments. For example, in some embodiments rotatable components of system 600 can have a defined and limited field of rotation through which said rotatable components may be rotatable, (e.g., 90-175 degrees).

In order to accommodate a defined and limited field of rotation, incremental rotation adjuster 610 can be configured to constrain any rotational activity of components of system 600 to remain within any limited fields of rotation. Incremental rotation adjuster 610 can further limit any rotation of components of system 600 to defined increments, according to some embodiments. In some embodiments, components of system 600 may be configured such that rotation must be constrained to specific increments, for example 5 degrees of rotation for a defined time interval. Further, incremental rotation adjuster 610 can be configured to constrain and govern rotation of components of system 600 accordingly in order to accommodate any specifications of some embodiments of system 600.

In some embodiments incremental rotation adjuster 610 can be implemented in order to constrain the rotation of components of system 600 in order to maximize efficiency or other metrics of system 600, or to accommodate properties of components of system 600 in order to maximize the life of and limit fatigue on components of system 600. Further, incremental rotation adjuster can also be configured to implement constraints for the rotation of components of system 600 according to other components and/or systems with which system 600 may operate in conjunction. For example, in some embodiments components of system 600 can be coupled to other systems and/or components that may have limitations relating to the rotation of components of system 600. As such, incremental rotation adjuster 610 can be configured to accommodate such limitations and implement corresponding constraints for system 600 such as defined and limited rotation increments for components of system 600.

Incremental rotation adjuster 610 is shown to be in communication with a voltage adjuster 612. Voltage adjuster 612 can be configured to receive an input from incremental rotation adjuster 610. Input from incremental rotation adjuster 610 can include a desired rotation to be achieved by adjusting the voltage provided to actuator 601, for example. In some embodiments, voltage adjuster 612 can determine a voltage corresponding to a rotation or desired rotation of components of system 600 based on an input from incremental rotation adjuster 610. Upon receiving an input from incremental rotation adjuster 610, voltage adjuster 612 can implement various techniques in order to determine necessary voltages of system 600.

In some embodiments, system 600 can include a means for user and/or operator influence on voltage adjuster 612, which may be direct or indirect. For example, incremental rotation adjuster 610 may be influenced by a knob or other instrument that allows for a user and/or operator to adjust rotation of components of system 600 in various ways. As such, voltage adjuster 612 can also be configured to function cooperatively with incremental rotation adjuster 610 and adjust voltage according to activity of incremental rotation adjuster 610 to provide desired rotation of components of system 600. In some embodiments input provided by voltage adjuster 612 to voltage applicator 614 can include voltages complying with any constraints and limitations implemented according to properties of system 600 or any components thereof or any desired user and/or operator specifications.

Memory 608 is shown to include voltage applicator 614, according to some embodiments. Voltage applicator 614 can receive an input signal from voltage adjuster 612, according to some embodiments. Further, voltage applicator 614 may carry constraints according to user and/or operator preferences or according to components of system 600 and any other systems and/or components working in conjunction with system 600 and any possible limitations thereof. For example, in some embodiments certain components of system 600 or those functioning in conjunction with system 600 may carry limitations relating to various voltages of system 600. Further, some embodiments may require that voltage be applied incrementally, i.e. 1V/100 ms. As such, voltage applicator 614 may implement constraints configured to optimize performance and/or protect specific components of system 600 as well as other associate systems and/or components.

Some embodiments may be configured to accommodate specifics systems that may function cooperatively with system 600. Further, some embodiments of system 600 may require fine voltage tuning or require varying voltage quantities subject to size of components of system 600 as well as properties of other cooperative systems, such as possible loads applied to components of system 600 and corresponding torque. In other embodiments, voltage applicator 614 can include constraints configured to accommodate user and/or operator specifications. For example, voltage applicator may only increment voltages to a specific voltage in order to maximize efficiency or minimize energy consumption. Further, some constraints that may be implemented via voltage applicator 614 may relate to components and/or systems that may be configured to function cooperatively with system 600. Voltage applicator 614 can also function differently in some embodiments according to delivery method of voltage or voltages within system 600. In some embodiments, for example, components of system 600 to which voltage is applied may vary by length, diameter, volume, as well as other properties. As such, voltage applicator 614 can be configured to accommodate different properties of components of system 600 to which voltage is applied and adjust operate accordingly.

Memory 608 is also shown to include a communications interface 624, according to some embodiments. In some embodiments, communications interface 624 can be configured to communicate operation of system 600 to a user and/or operator. Communications interface 624 can, for example, indicate activity of one or more components of system 600. Further, communications interface 624 may communicate to a user and/or operator rotation values associated with incremental rotation adjuster 610, or voltage values associated with voltage adjuster 612 and/or voltage applicator 614. In some embodiments, communications interface 624 can be configured to communicate parameters or constraints to a user that may be in place for system 600 and/or one or more components thereof. Communications interface 624 may further be configured to communicate alerts including warnings to a user and/or operator. Such alerts may, in some embodiments, include indications of power consumption and other metrics as well as upcoming required maintenance and other possible alerts.

System 600 is shown to include voltage source 616, according to some embodiments. Voltage source 616 is shown to be in communication with voltage applicator 614, according to some embodiments. In some embodiments, voltage source 616 can depend on other components of system 600 and/or any other systems and/or components implemented to function cooperatively with system 600. In some embodiments, voltage source 616 can be a low 24V SELV (safety extra-low voltage). A 24V SELV voltage can address safety concerns, as such a voltage would not be great enough to cause a lethal shock under most circumstances.

Voltage source 616 can receive communication from voltage applicator 614, which may correspond to communication from voltage adjuster 612 and ultimately incremental rotation adjuster 610. That is to say that voltage source 616 may provide a specific voltage or range of voltages according to communication received from voltage adjuster 612 via voltage applicator 614, which can correspond to incremental rotation values from incremental rotation adjuster 610 for components of system 600. Voltage source 616 can also be configured to apply voltage at one or more locations, according to some embodiments. Further, voltage source 616 may also be configured to provide pulses at one or more locations in some embodiments. In some embodiments, voltage source 616 can be configured to apply voltage pulses to wires 618 which in turn apply said pulses to shape memory alloy springs 620. In some embodiments, shape memory alloy springs 620 may include multiple components which may be reached by pulses of voltage source 616. Further, voltage source 616 may provide alternating pulses to wires 618, wherein the pulses may be of varying magnitude and duration, according to some embodiments.

In some embodiments, shape memory alloy springs 620 can be a nickel titanium alloy or similar. Shape memory alloy springs 620 can be connected to voltage source 616 which can allow for voltage pulses from voltage source 616 to reach shape memory alloy springs 620 via wires 618, according to some embodiments. In some embodiments, shape memory alloy springs 620 may include multiple components and may also include components that vary by shape. For example, in some embodiments, shape memory alloy springs 620 can include two coil-like structures, which may vary in size, shape, length, and other parameters. In some embodiments, shape memory alloy springs 620 can be connected to voltage source 616 via wires 618 which allow shape memory alloy springs 620 to receive pulses from voltage source 616 which may be governed by controller 602 and components thereof. In some embodiments, springs of shape memory alloy springs 620 may respond to the application of varying low voltages of voltage source 616. Further, shape memory alloy springs 620 may respond to receiving low voltage pulses by contracting.

Shape memory alloy springs 620 may also lock upon contracting after receiving a low-voltage pulse. In some embodiments, shape memory alloy springs 620 can be coupled to shaft hub arms 622, with shaft hub arms 622 comprising two collinear arms configured to rotate about a central point. As wires 618 receive alternating pulses from voltage source 616 which are in turned applied to shape memory alloy springs 620, shape memory alloy springs 620 may contract alternately according to the pulses received. Further, various magnitudes and durations of low-voltage pulses applied to shape memory alloy springs 620 can cause varying degrees of contraction. Additionally, as shape memory alloy springs 620 can be connected to shaft hub arms 622, contraction of shape memory alloy springs 620 driven by alternating pulses from voltage source 616 can cause teeter-totter motion of shaft hub arms 622 and subsequently control various amounts of torque (i.e. 10 Nm of torque). As such, components of system 600 which can be positioned between shaft hub arms 622 which can be collinear may be actuated. In some embodiments, actuation of shaft hub arms 622 can range from 90-175 degrees, according to some embodiments.

Shape memory alloy springs 620 of FIG. 6 has certain properties that can allow for the use of shape memory alloy springs 620 to be more desirable than traditional methods for actuation. In some systems, geared members are used in actuation for a variety of purposes of system 600. However, shape memory alloy offers advantages that more traditional geared members and mechanisms lack. Shape memory alloy can, for example, accomplish results the same as and/or similar to traditional geared mechanisms at much lower costs. System 600 of FIG. 6 for example may accomplish the same or similar results as geared mechanisms but eliminates costly and complicated gearing and motors. Gearing and motors can have high associated costs and typically wear out quickly relative to shape memory alloy and as such carry a much shorter lifespan. Shape memory alloy can also be impervious to most decay, which can contribute to the superior lifespan that shape memory alloy can have over traditional geared mechanisms. As such, shape memory alloy can offer a much less complex and cheaper alternative to many traditional geared mechanisms. Shape memory alloy can also offer a reduced footprint relative to some traditional geared mechanisms. For example, traditional geared mechanisms including geared members and motors are commonly used in industry to rotate shafts as well as operate dampers, valves, and other components. The components of system 600 of FIG. 6, for example, can accomplish the same or similar operation of industry components while offering a reduced footprint relative to traditional geared mechanisms thus offering increased space efficiency and allowing for other possible efficiency measures to be implemented (i.e. smaller housing, etc.).

Figure 7:
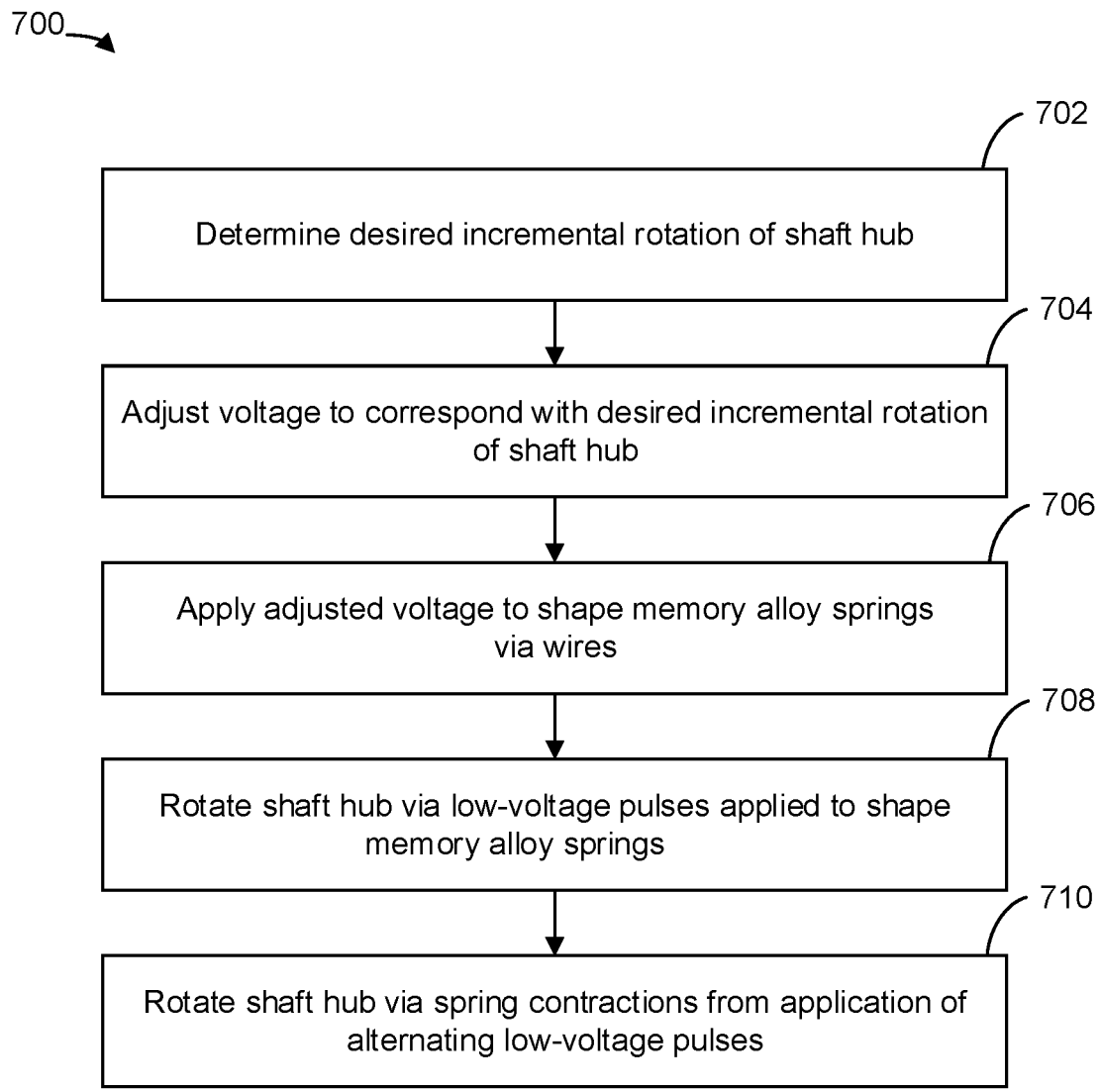
FIG. 7 is a flowchart of a process for operating the actuator of FIG. 6, according to some embodiments.

Referring now to FIG. 7, a flowchart of a process for operating the actuator of FIG. 6, is shown according to some embodiments. Process 700 can be performed by one or more components of system 600 of FIG. 6. Further, process 700 can be performed by components and/or systems configured to function cooperatively or in conjunction with the components and/or system of FIG. 6. Process 700 generally relates to applying low-voltage pulses to shape memory alloy components shaped as springs and connected to a pair of collinear shaft arms such that alternating low-voltage pulses applied to shape memory alloy components cause contraction of shape memory alloy thus driving teeter-totter motion of shaft arms to which a shaft is connected, according to some embodiments. Process 700 can be adapted in order to accommodate some components and/or systems and can also apply to a variety of systems. It should be noted that process 700 may be repeated, may include additional steps, or may be an iterative or cyclical process.

In step 702, process 700 is shown to include determining desired incremental rotation of the shaft hub. Step 702 can include operations performed by incremental rotation adjuster 610 of system 600 of FIG. 6. In some embodiments, step 702 can involve input from a user and/or operator for desired incremental rotation. For example, step 702 may include specific incremental rotation of the shaft hub in order to accomplish a specific task, which may require specific increments. Step 702 can also include determining desired incremental rotation of the shaft hub based on components and/or systems that may be acting cooperatively with system 600 of FIG. 6. For example, step 702 may involve determining desired incremental rotation of the shaft hub relative to a load that may be applied to the shaft. Step 702 can also correspond to system 600 in which desired incremental rotation of the shaft hub may be constrained within a certain range, i.e. 90-175 degrees.

In step 704, process 700 is shown to include adjusting voltage to correspond with desired incremental rotation of the shaft hub. Step 704 can include operations that may be performed by voltage adjuster 612 as well as voltage applicator 614 of FIG. 6, according to some embodiments. Step 704 can include receiving an input relating to step 702 of process 700. For example, step 704 may include receiving an indication of a desired incremental rotation of the shaft hub. Step 704 can then also include the determination of a voltage that may correspond to said desired incremental rotation of the shaft hub. In some embodiments, voltage magnitudes corresponding to degrees of incremented rotation of the shaft hub may vary according to factors including size of components involved as well as possible loading. In some embodiments, voltage adjustment of step 704 may be constrained. For example, voltage may be constrained to a certain range in order to satisfy compatibility requirements or address desired metrics from a user and/or operator. Further, possible constraints of step 704 can include voltage magnitudes as well as time durations, according to some embodiments.

In step 706, process 700 is shown to include applying the adjusted voltage to shape memory alloy which can be similar to shape memory alloy springs 620 of FIG. 6, according to some embodiments. Step 706 can include a low-voltage voltage source that may be similar to voltage 616 of system 600 in FIG. 6. In some embodiments, voltage applied in step 706 may be from a SELV voltage source which may include for example a low 24V SELV voltage source similar to voltage source 616 of FIG. 6. Further, voltage applied in step 706 may be applied as pulses. Pulses of the applied voltage of step 706 can be applied to one or more points, for example such as in system 600 of FIG. 6. Step 706 can include multiple shape memory alloy components, such as a pair of springs in some embodiments. Further, shape memory alloy can be the same as or similar to shape memory alloy springs 620 of system 600 in FIG. 6. In some embodiments, step 706 may include applying voltage pulses to a pair of shape memory alloy springs. According to some embodiments, application of voltage to shape memory alloy springs can vary in pulse magnitude and duration of applied voltage.

In step 708, process 700 is shown to include rotating the shaft hub through contractions caused by low-voltage pulses applied to the shape memory alloy, according to some embodiments. In some embodiments, shape memory alloy springs of step 706 may be coupled to the shaft. Further, upon the application of low-voltage pulses to shape memory alloy springs in step 706, shape memory alloy springs can contract. In some embodiments in which shape memory alloy springs are coupled to the shaft arms, this contraction can pull the shaft arm. As such, alternating pulses applied to the two shape memory alloy springs can drive teeter-totter motion of the shaft arms and ultimately the shaft hub. The shaft of the shaft hub may experience loading, for which voltage can be incremented in order to achieve desired rotation of shaft hub. Further, in some embodiments shape memory alloy springs can be configured to lock upon contracting after receiving a low-voltage pulse and as such can facilitate repeated alternating low voltage pulses, thus controlling various amount of torque (i.e. 10 Nm of torque). Low voltage pulses applied in step 706 can be adjusted according to desired torque and degree of rotation of the shaft hub and shaft arms.

In step 710, process 700 is shown to include rotating the shaft hub via spring contractions via alternating low-voltage pulses, according to some embodiments. In some embodiments, alternating low voltage pulses applied to the shape memory alloy can vary in magnitude and duration. For example, in the event that the shaft hub is experiencing a substantial load, pulses of greater magnitude and/or extended duration may be required in order to achieve desired rotation of the shaft hub. Further, step 710 may also be repeated multiple times, which is to say that the shaft hub may be rotated back and forth in a teeter-totter motion by the alternating low-voltage pulses driving the spring contractions. Additionally, step 710 may be repeated independently or in conjunction with other steps of process 700 in order to adjust incremental rotation of the shaft hub and/or to adjust speed of rotation by increasing or decreasing the amplitude and/or duration of the low-voltage pulses applied to the springs.

Figure 8A:
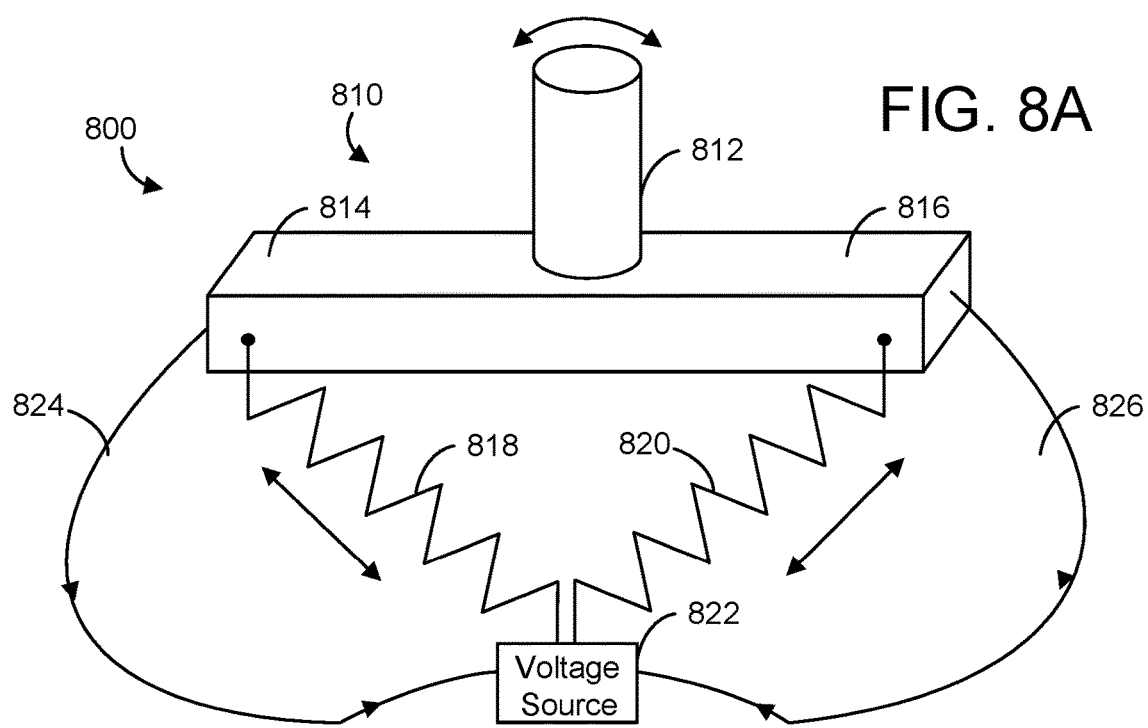
FIG. 8A is a perspective view of the control system of FIG. 6 using shape memory components to rotate a shaft, according to some embodiments.

Referring now to FIG. 8A, a perspective view of the control system of FIG. 6 using shape memory components to rotate a shaft is shown, according to some embodiments. System for actuation 800 can vary both in terms of size and proportion of any components thereof. In some embodiments, system 800 may be configured to operate in conjunction with other systems and/or components. For example, in some embodiments system 800 may be configured to facilitate a process for which other systems and/or components can be involved. Further, system 800 can also include additional components or alternative components to those seen in FIG. 8A.

System 800 is shown to include a shaft hub 810, according to some embodiments. Shaft hub 810 is shown to include a shaft 812, a first shaft arm 814, and a second shaft arm 816. Shaft hub 810 can be configured to rotate about a fixed central point, according to some embodiments. In some embodiments, shaft hub 810 can be mounted or otherwise such positioned that portions or the entirety of shaft 812, first shaft arm 814, and/or second shaft arm 816 may be free of contact with any other surfaces in order to facilitate rotation thereof. Shaft hub 810 can vary in size as well as proportion, according to some embodiments. For example, shaft 812 may vary in length depending on desired purpose for shaft 812 and shaft hub 810. Further, larger-scale applications may require shaft 812 to be longer or have a greater diameter in order to accommodate increased loads, as well as other circumstances.

Shaft 812 can be coupled to first shaft arm 814 and second shaft arm 816 through a variety of means, according to some embodiments. In some embodiments, first shaft arm 814 and second shaft arm 816 may be coupled to each other as well as to shaft 812 or may be associatively coupled by both being coupled to shaft 812. In some embodiments, first shaft arm 814 and second shaft arm 816 can be collinear and extend from shaft 812 at 180 degree opposing angles. First shaft arm 814 and second shaft arm 816 can be of an equal size including equal mass, thickness, length, and width, according to some embodiments. According to some embodiments, first shaft arm 814 and second shaft arm 816 can be coupled at the base of shaft 812. Further, in some embodiments first shaft arm 814 and second shaft arm 816 may be coupled so as to form a single member, with shaft 812 coupled about a central point on top of such a single member.

First shaft arm 814 and second shaft arm 816 are shown to be coupled to a first shape memory alloy shape memory alloy spring 818 and a second shape memory alloy spring 820, according to some embodiments. According to some embodiments, first shape memory alloy shape memory alloy spring 818 and second shape memory alloy spring 820 can be anchored and/or coupled to first shaft arm 814 and second shaft arm 816, respectively, on distal portions of first shaft arm 814 and second shaft arm 816. First shape memory alloy shape memory alloy spring 818 and second shape memory alloy shape memory alloy spring 820 may be composed of, for example, a nickel titanium alloy. First shape memory alloy shape memory alloy spring 818 and second shape memory alloy spring 820 can vary in length as well as other parameters such as thickness and coil diameter as well as other properties. According to some embodiments, first shape memory alloy shape memory alloy spring 818 and second shape memory alloy spring 820 can be positioned below shaft hub 810 at or near a center point seen as a voltage source 822. In some embodiments, first shape memory alloy shape memory alloy spring 818 and second shape memory alloy spring 820 may be fixed at a center point that does not also feature voltage source 822. In some embodiments, first shape memory alloy shape memory alloy spring 818 and second shape memory alloy shape memory alloy spring 820 can be configured in a v-shape such that both first shape memory alloy spring 818 and second shape memory alloy shape memory alloy spring 820 each form a hypotenuse of a right triangle, thus maximizing the spring length that can be implemented spanning from voltage source 822 to distal portions of first shaft arm 814 and second shaft arm 816 for first shape memory alloy spring 818 and second shape memory alloy shape memory alloy spring 820, respectively.

Voltage source 822 can be connected to first shape memory alloy spring 818 and second shape memory alloy shape memory alloy spring 820, according to some embodiments. In some embodiments, voltage source 822 can also serve to anchor first shape memory alloy spring 818 and second shape memory alloy shape memory alloy spring 820 at or near a center point below shaft hub 810. Further, means by which first shape memory alloy spring 818 and second shape memory alloy shape memory alloy spring 820 can connect to voltage source 822 may vary. For example, in some embodiments voltage source 822 may feature one or more recesses that may be disposed at or near a central point into which an end of first shape memory alloy spring 818 and second shape memory alloy shape memory alloy spring 820 can be inserted and subsequently secured. According to some embodiments, first shape memory alloy spring 818 and second shape memory alloy spring 820 can be secured on an external surface of voltage source 822 which may be at or near a central point below shaft hub 810. Voltage source 822 can be a SELV voltage source, which can serve as a safety precaution given that SELV voltages are too weak to deliver a fatal shock in most situations. Voltage source 822 can deliver low-voltage pulses of adjustable magnitude and duration and may apply such pulses in an alternating fashion to both first shape memory alloy spring 818 as well as second shape memory alloy spring 820, according to some embodiments. That is to say that in some embodiments, voltage source 822 may deliver a first pulse to first shape memory alloy spring 818, and then may deliver a second pulse to second shape memory alloy spring 820 before delivering a third pulse to first shape memory alloy spring 818.

First shape memory alloy spring 818 and second shape memory alloy spring 820 can be composed of shape memory alloy such as a nickel titanium alloy, according to some embodiments. As such, first shape memory alloy spring 818 and second shape memory alloy spring 820 can be configured to contract in response to the application of a low-voltage pulse applied by voltage source 822. In some embodiments, voltage source 822 may deliver a first pulse to first shape memory alloy spring 818, which may cause first shape memory alloy spring 818 to contract and thus pull the distal portion of first shaft arm 814 closer to voltage source 822 where one end of first shape memory alloy spring 818 may be anchored beneath shaft hub 810. Shaft hub 810 can be configured about an axis allowing for rotation of shaft hub 810 thereof. As first shape memory alloy spring 818 may contract and pull the distal portion of first shaft arm 814 closer to the anchor point of first shape memory alloy spring 818, second shape memory alloy spring 820 can elongate in an inversely proportional manner to the contraction of first shape memory alloy spring 818 in response to second shaft arm 816 moving away from the anchor point of second shape memory alloy spring 820. Following the administration of a low-voltage pulse driving contraction of first shape memory alloy spring 818, first shape memory alloy spring 818 can be configured to lock in place. In some embodiments, shaft 812 may experience a load, in which case first shape memory alloy spring 818 and second shape memory alloy spring 820 can provide variable torque and when locked in place following the administration of a low-voltage pulse and no longer requires constant power to hold any torque load. Similarly, voltage source 822 can then provide a second pulse to second shape memory alloy spring 820, which can cause second shape memory alloy spring 820 to contract. Contraction of second shape memory alloy spring 820 can cause inversely proportional elongation of first shape memory alloy spring 818 as the distal portion of first shaft arm 814 is pulled away from the anchor point of first shape memory alloy spring 818 and the distal portion of second shaft arm 816 is subsequently pulled closer to the anchor point of second shape memory alloy spring 820 and contraction thereof second shape memory alloy spring 820. Said process can be repeated multiple times in order to cause rotation of shaft hub 810 about a central axis, and subsequently rotate shaft 812 about an axis. Further, low-voltage impulses generated and applied by voltage source 822 can vary in both duration and magnitude in order rotate shaft hub 812 varying degrees. In some embodiments, system 800 may have a defined range of motion, i.e. 90-175 degrees. Further, in some embodiments contraction of first shape memory alloy spring 818 and corresponding elongation of second shape memory alloy spring 820 (and vice-versa) may not be inversely proportional. It may be desirable to rotate shaft hub 810 through a range of motion that requires that first shape memory alloy spring 818 contracts more than second shape memory alloy spring 820 does in which case system 800 may directed to operate as such or otherwise configured to operate as such, for example in an unbalanced teeter-totter motion. Further, in some embodiments first shape memory alloy spring 818 and second shape memory alloy spring 820 may not be the same length, which could further lead to non-proportional contraction and elongation, as well as other possible factors.

It should be noted that, in some embodiments, system 800 may include one or more wires, shown in system 800 as a first wire 824 and a second wire 826 extending from first shaft arm 814 and/or second shaft arm 816, respectively, back to voltage source 822, according to some embodiments. According to some embodiments, first wire 824 and/or second wire 826 may serve to complete one or more circuits and can also reduce any potential for a shock to be administered. While voltage source 822 can be an SELV voltage source producing voltages low enough to not administer a fatal shock in most situations, even non-fatal shocks can cause problems with system 800 and/or other components and/or systems operating in conjunction with system 800.

Figure 8B:
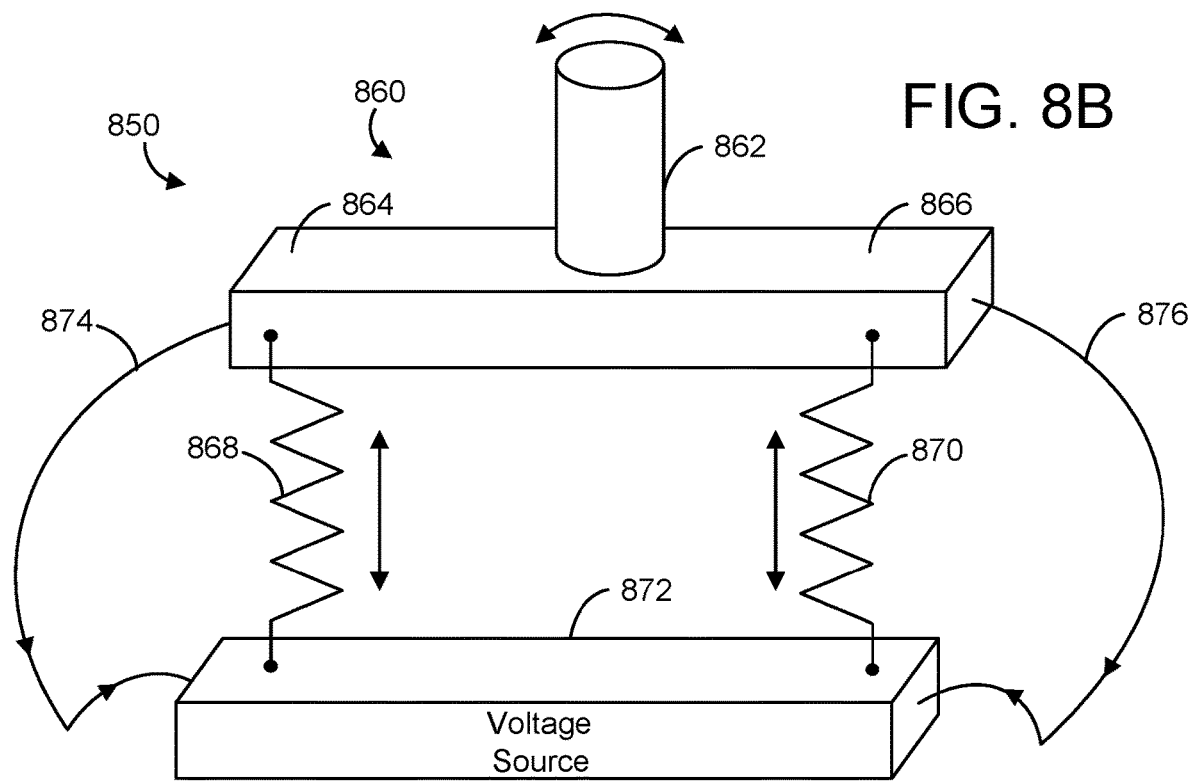
FIG. 8B is a perspective view of an alternative embodiment of the control system of FIG. 6 using shape memory components to rotate a shaft, according to some embodiments.

Referring now to FIG. 8B, a perspective view of an alternative embodiment of the control system of FIG. 6 using shape memory components to rotate a shaft, according to some embodiments. System 850 can be configured similarly to system 800 of FIG. 8A but some components of FIG. 8B can also be configured differently. In some embodiments, system 850 may perform an operation more efficiently or effectively than system 800, or in some embodiments system 850 may be an optimal system relative to system 800 due to different positioning of components and a different footprint. Similar to system 800, system 850 can be implemented in conjunction with other components and/or systems.

System 850 is shown to include a shaft hub 860, according to some embodiments. Shaft hub 860 is shown to include a shaft 862, as well as a first shaft arm 864 and a second shaft arm 866. Shaft hub 860, shaft 862 first shaft arm 864 and second shaft arm 866 can, in some embodiments, be analogous to components of FIG. 8A including shaft hub 810, shaft 812, first shaft arm 814, and second shaft arm 816. More specifically, first shape memory alloy spring 868 and second shape memory alloy spring 870 can be nickel titanium alloys or other shape memory alloys and can function similarly to first shape memory alloy spring 818 and second shape memory alloy spring 820 in terms of contracting when low-voltage pulse is applied.

System 850 is shown to include a voltage source 872, according to some embodiments. Voltage source 872 can be analogous to voltage source 822 of FIG. 8A in some embodiments but can also be dissimilar. In some embodiments, voltage source 872 is configured to be a SELV voltage source capable of delivering low-voltage pulses to one or more locations such as first shape memory alloy spring 868 and second shape memory alloy spring 870. Voltage source 872 is shown to include anchor points for first shape memory alloy spring 868 and second shape memory alloy spring 870, according to some embodiments. Similar to voltage source 822 of FIG. 8A, voltage source 872 may feature one or more recesses that may be disposed at or near a central point into which an end of first shape memory alloy spring 868 and second shape memory alloy spring 870 are inserted and subsequently secured. According to some embodiments, first shape memory alloy spring 868 and second shape memory alloy spring 870 can be secured on an external surface of voltage source 872. In some embodiments, first shape memory alloy spring 868 and second shape memory alloy spring 870 may be secured within or on a surface of voltage source 872 directly below connection points on first shaft arm 814 and second shaft arm 816, respectively. Subsequently, the configuration of system 850 of FIG. 8B can require that first shape memory alloy spring 868 and second shape memory alloy spring 870 be shorter than first shape memory alloy spring 818 and second shape memory alloy spring 820 of FIG. 8A, respectively. As such, system 850 may occupy a smaller footprint than system 800 but may also offer more limited contraction and elongation of first shape memory alloy spring 868 and second shape memory alloy spring 870 relative to that of first shape memory alloy spring 818 and second shape memory alloy spring 820 of system 800 of FIG. 8A. The smaller footprint of system 850 may be more desirable than that of system 800 for some applications in which space efficiency is a priority. First shape memory alloy spring 868 and second shape memory alloy spring 870 can be configured to be the same size and length or different sizes and/or lengths, which is to say that contraction and elongation of first shape memory alloy spring 868 and second shape memory alloy spring 870 may not be directly or inversely proportional. System 850 is further shown to include a first wire 874 and a second wire 876, according to some embodiments, which can function the same or similar to first wire 824 and second wire 826 of system 800 of FIG. 8A.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain operation or group of operations.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. An actuator system, comprising:
a shaft hub comprising a shaft and at least two collinear shaft arms coupled to the shaft;
one or more shape memory alloy springs coupled to each of the at least two collinear shaft arms;
a voltage source configured to apply a voltage to the one or more shape memory alloy springs, the voltage causing the one or more shape memory alloy springs to change in size or shape, thereby applying a force to the at least two collinear shaft arms and causing the shaft hub to rotate; and
a processing circuit comprising a processor and memory storing instructions executed by the processor, the processing circuit configured to:
receive an indication of a desired incremental rotation for the shaft hub; and
apply a voltage corresponding to the desired incremental rotation for the shaft hub to the one or more shape memory alloy springs rotating the shaft and the shaft hub about a central axis.

2. The actuator system of claim 1, wherein the voltage source is connected to the shape memory alloy springs and capable of providing alternating low-voltage pulses of varying magnitudes and durations.

3. The actuator system of claim 1, wherein each of the shape memory alloy springs are connected to one of the collinear shaft arms on a distal portion thereof.

4. The actuator system of claim 1, wherein the shape memory alloy springs are coupled to the collinear shaft arms and extend from the collinear shaft arms at an oblique angle and are further coupled to the voltage source, with the shape memory alloy springs forming a V-shape.

5. The actuator system of claim 1, wherein the shape memory alloy springs are coupled to the collinear shaft arms and the voltage source such that the shape memory alloy springs are configured parallel to one another.

6. The actuator system of claim 1, wherein the voltage is determined in response to the desired incremental rotation for the shaft hub.

7. The actuator system of claim 6, wherein the voltage source applies the voltage to shape memory alloy springs such that complimentary contraction and elongation of the one or more shape memory alloy springs occur rotating the shaft and the shaft hub about a central axis.

8. The actuator system of claim 1, wherein the shaft hub is configured to rotate according to a designated incremental rotation.

9. The actuator system of claim 8, wherein the shaft hub is configured to lock after successively rotating the designated incremental rotation.

10. The actuator system of claim 1, wherein the shape memory alloy springs comprise a nickel titanium alloy.

11. A control system comprising:
a processing circuit comprising a processor and memory storing instructions that, when executed by the processor, cause the processor to:
receive an indication of a desired incremental rotation for a shaft and a shaft hub, the shaft hub coupled to at least two collinear shaft arms;
determine a voltage corresponding to the desired incremental rotation of the shaft hub; and
apply the voltage from a voltage source to one or more shape memory alloy springs through wires, each of the one or more shape memory alloy springs connected to each one of the collinear shaft arms, the voltage causing the one or more shape memory alloy springs to change in size or shape, thereby applying a force to the at least two collinear shaft arms and causing the shaft hub to rotate.

12. The control system of claim 11, wherein the voltage source is connected to the one or more shape memory alloy springs and configured to provide the voltage as alternating voltage pulses of varying magnitudes and durations.

13. The control system of claim 11, wherein each of the one or more shape memory alloy springs is connected to one of the collinear shaft arms on a distal portion thereof.

14. The control system of claim 11, wherein the one or more shape memory alloy springs are coupled to the collinear shaft arms and extend from the collinear shaft arms at an oblique angle and are further coupled to the voltage source, with the one or more shape memory alloy springs forming a V-shape.

15. The control system of claim 11, wherein the one or more shape memory alloy springs are coupled to the collinear shaft arms and the voltage source such that the one or more shape memory alloy springs are parallel to one another.

16. The control system of claim 11, wherein the shape memory alloy springs comprise a nickel titanium alloy.

17. The control system of claim 16, wherein the voltage source applies the voltage to the one or more shape memory alloy springs such that at least one of the shape memory alloy springs is contracted while another of the shape memory alloy springs is elongated, rotating the shaft and the shaft hub about a central axis.

18. The control system of claim 11, wherein the shaft hub is configured to rotate according to a designated incremental rotation.

19. The control system of claim 18, wherein the shaft hub is configured to lock after successively rotating the designated incremental rotation.

20. A method of actuation, the method comprising:
receiving an indication of a desired incremental rotation for a shaft hub, the shaft hub coupled to at least two collinear shaft arms;
determining a voltage corresponding to the desired incremental rotation of the shaft hub;
applying the voltage from a voltage source to one or more shape memory alloy springs through wires, each of the one or more shape memory alloy springs connected to one of the collinear shaft arms, the voltage causing the one or more shape memory alloy springs to change in size or shape, thereby applying a force to the collinear shaft arms; and
rotating the shaft hub as a result of the force applied by the one or more shape memory alloy springs to the at least two collinear shaft arms.

* * * * *